(No Model.)

S. M. GRAGG & W. T. WIGGER.
ANIMAL TRAP.

No. 461,079. Patented Oct. 13, 1891.

Witnesses
Jas. K. M?Cathran
H. F. Riley

Inventors
Seymour M. Gragg
William T. Wigger
By their Attorneys,
C. A. Snow & Co.

THE NORRIS PETERS CO., PHOTO-LITHO., WASHINGTON, D. C.

UNITED STATES PATENT OFFICE.

SEYMOUR M. GRAGG AND WILLIAM T. WIGGER, OF MAYESBURG, MISSOURI.

ANIMAL-TRAP.

SPECIFICATION forming part of Letters Patent No. 461,079, dated October 13, 1891.

Application filed April 15, 1891. Serial No. 389,050. (No model.)

*To all whom it may concern:*

Be it known that we, SEYMOUR M. GRAGG and WILLIAM T. WIGGER, citizens of the United States, residing at Mayesburg, in the county of Bates and State of Missouri, have invented a new and useful Rat-Trap, of which the following is a specification.

The invention relates to improvements in animal-traps.

The object of the present invention is to simplify and improve the construction of traps and to enable the same to be operated with little or no noise, and to enable animals, especially rats, to be caught without leaving trace upon the trap to frighten other animals.

The invention consists in the construction and novel combination and arrangement of parts, hereinafter fully described, illustrated in the accompanying drawings, and pointed out in the claims hereto appended.

Figure 1:
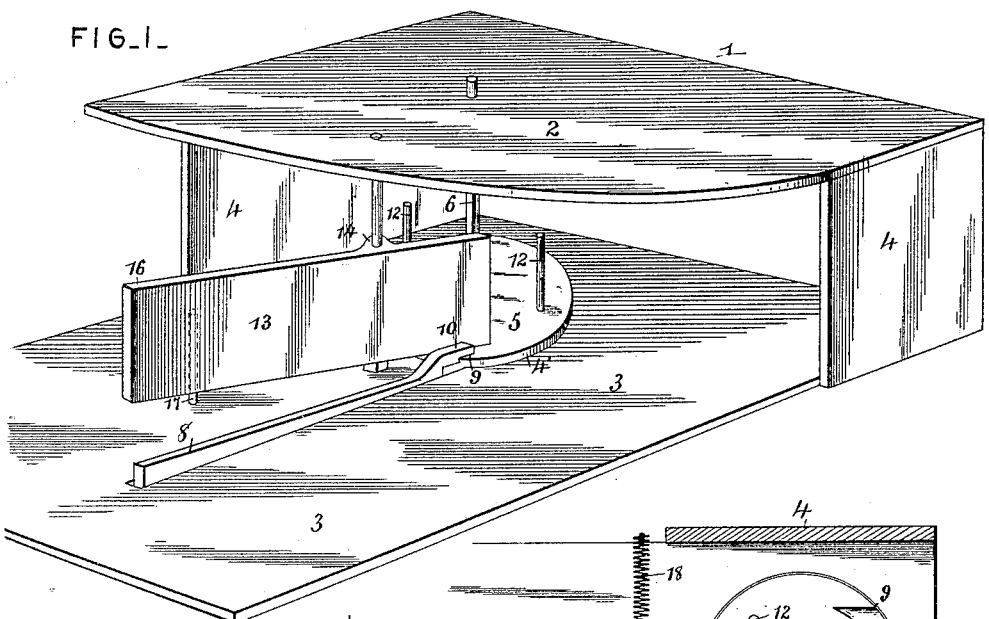
Figure 2:
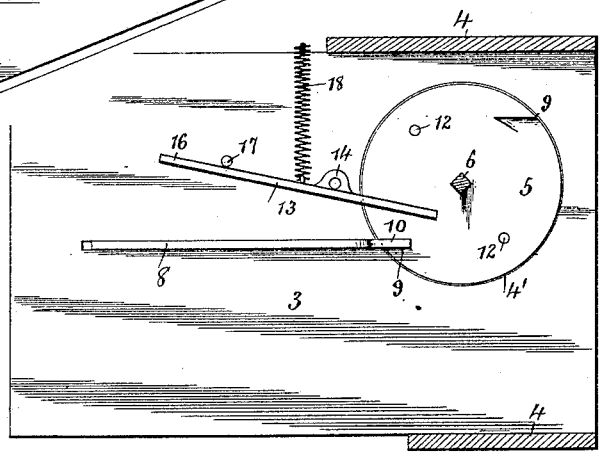
Figure 3:
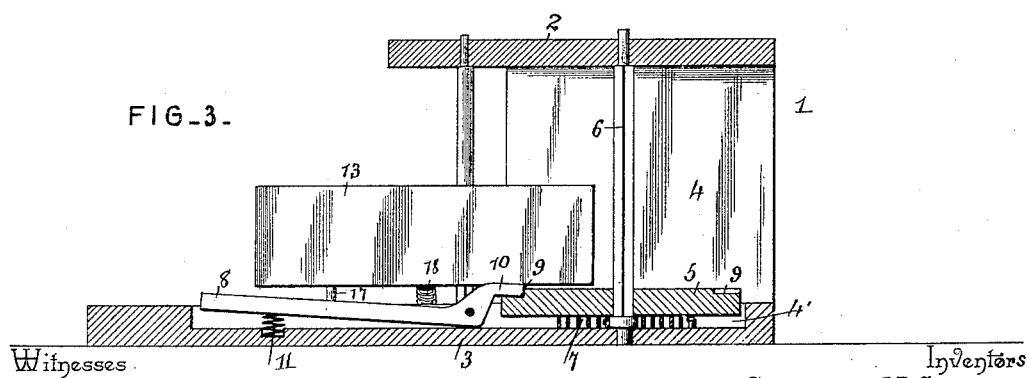

In the drawings, Figure 1 is a perspective view of a trap embodying the invention. Fig. 2 is a horizontal sectional view. Fig. 3 is a vertical longitudinal sectional view.

Referring to the accompanying drawings, 1 designates a trap consisting of a top 2, bottom 3, and sides 4, and the bottom is provided with a circular recess 4', in which is arranged a disk 5, which is mounted upon the squared shaft 6, journaled in the top and bottom of the frame and secured to one end of a barrel-spring 7, which has its other end attached to the bottom, and is adapted to be wound by the shaft to actuate the disk 5 when a trigger 8 is pressed by an animal. The disk is provided with shoulders 9, which are arranged diametrically opposite each other and are engaged alternately by one end 10 of the lever 8, which is arranged in a recess of the bottom, and has its other end engaged by a spring 11 to hold the end 10 normally with the disk 5, and the latter are provided with tappets 12, which are oppositely disposed and arranged between the shoulders 9, and are adapted to engage one end of a striking bar or lever 13, which is fulcrumed on a pivot 14, and has one end arranged over the disk and the other end arranged to pass over the trigger and strike an animal pressing the said trigger, to throw the same into a suitable receptacle or cage having a trap-door.

Animals to be trapped are attracted by a suitable bait placed near the lever 8.

The striking bar or lever 13 has its end 16 normally engaging a post 17 by a spring 18, and the other end of the striking bar or lever is adjacent the end 10 of the trigger and in proper position to be engaged by one of the tappets of the disk.

It will be seen that at each revolution of the disk the trap will be operated twice, and that at each winding of the spring a great number of operations can be secured, and the number will vary with the length of the spring, and it will also be seen that a simple and inexpensive self-set and ever-set trap is produced.

The operation of the trap is as follows: Granulated or crumbled cheese or other substance for bait is sprinkled over the base of the trap near the lever or trigger, and a rat eating the bait will, in moving around, strike the lever or trigger and spring the trap.

What we claim is—

1. In a trap, the combination of the frame, the spring-actuated disk provided with a tappet, the striking-bar pivotally mounted in the frame and arranged to be engaged by the tappet, and the trigger, substantially as described.

2. In a trap, the combination of the frame, the spring-actuated disk provided with the oppositely-disposed tappets and having the shoulders, the pivotally-mounted striking-bar having one end arranged to be engaged by the tappets and the other end arranged to strike an animal, and the trigger arranged to engage the shoulders of the disk, substantially as described.

3. The combination of the frame, the spring-actuated disk provided with oppositely-disposed tappets and having shoulders, the trigger arranged to engage the shoulders, the post 17, the striking-bar pivotally mounted in the frame and having one end arranged to be engaged by the tappets, and a spring arranged to hold the other end of the striking-bar normally against the post, substantially as described.

In testimony that we claim the foregoing as our own we have hereto affixed our signatures in presence of two witnesses.

SEYMOUR M. GRAGG.
WILLIAM T. WIGGER.

Witnesses:
SLADER E. GRAGG,
ALICE P. WIGGER.